W. C. JOHNSON.
CHAIN FASTENER.
APPLICATION FILED APR. 6, 1918.
1,278,477.
Patented Sept. 10, 1918.
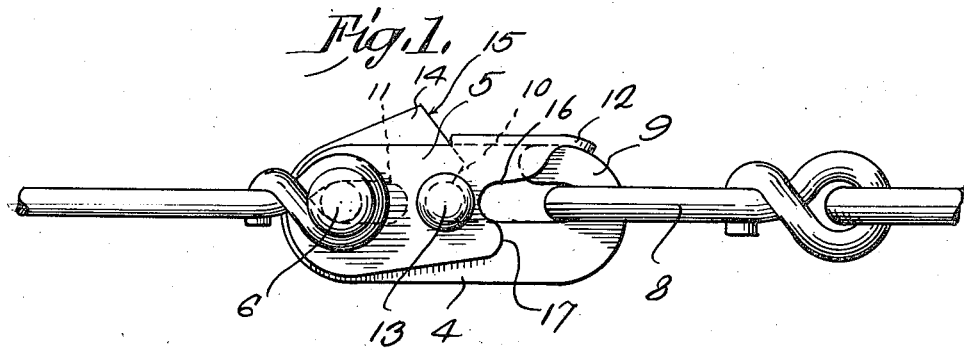
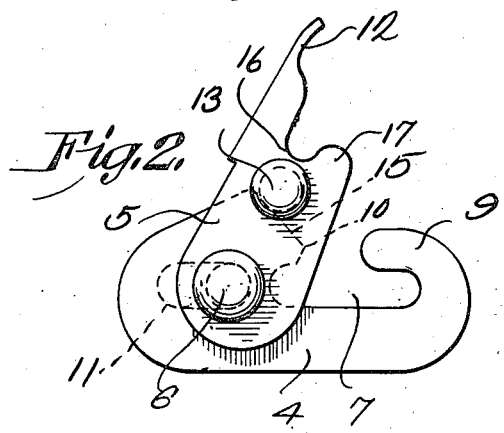
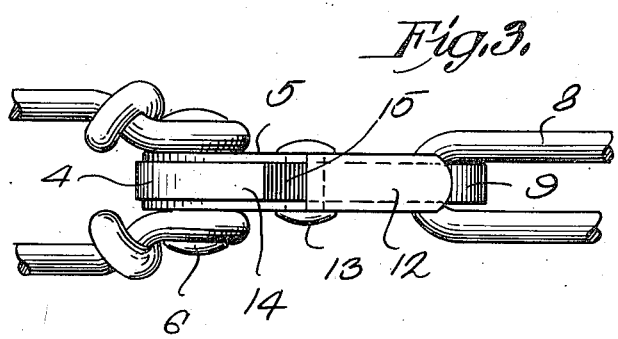
WITNESSES
R. W. Hoagland
Dwight B. Galt
INVENTOR
Walter C. Johnson,
BY Richard B. Owen
ATTORNEY

UNITED STATES PATENT OFFICE.

WALTER C. JOHNSON, OF SMITH MILLS, PENNSYLVANIA.

CHAIN-FASTENER. REISSUED

1,278,477. Specification of Letters Patent. Patented Sept. 10, 1918.

Application filed April 6, 1918. Serial No. 227,055.

*To all whom it may concern:*

Be it known that I, WALTER C. JOHNSON, a citizen of the United States, residing at Smith Mills, in the county of Clearfield and State of Pennsylvania, have invented certain new and useful Improvements in Chain-Fasteners, of which the following is a specification.

This invention relates to chain fasteners, and particularly to fastening means for the ends of tire chains, aiming for its primary object to provide means of this character which shall be of simplified and improved construction, capable of being easily actuated, and which will prove thoroughly efficient and practical in use.

A further object of the invention is to provide a fastener of the character stated, which is equipped with an improved locking means for preventing the holding keeper moving to open position, which locking means is effectuated by the tension of the chain.

A further object is to provide a fastening hook for chain ends which is constructed in such manner as to prevent mud working into the locking device and moving the latter to releasing position.

With these objects in view, together with others which will appear as the description proceeds, the invention resides in the novel formation, combination and arrangement of parts, all as will be described more fully hereinafter, illustrated in the drawings, and particularly pointed out in the claims.

In the drawings:—

Figure 1 is a side elevation of a chain fastener constructed in accordance with the invention, the fastener being shown as applied to the ends of a conventional form of chain, Fig. 2 is a similar view of the fastener removed from the chain ends, and illustrating the keeper in open position, and Fig. 3 is a top plan view of the device as it appears in Fig. 1.

The fastener of my invention comprises a hook member indicated generally at 4 and a keeper indicated at 5 and pivoted at one end as at 6 to one end of the hook member 4. The keeper is adapted when swung to closed position to retain a chain link within the hook portion of the member 4.

The member 4 comprises a plate formed of suitable metal and this plate is provided with a cutout portion or channel 7 extending longitudinally thereof. This channel is adapted to receive the end of a chain link indicated at 8, and a bill 9 constituting the hook portion of the plate prevents the link from moving in one direction in the channel. The opposite end of the channel 7 lies beneath an overhanging shoulder indicated at 10, for a purpose to be hereafter detailed.

The keeper 5 may be formed of thin, light metal bent upon itself so as to straddle the plate 4, and the pivot pin 6 extends through the spaced side members of this keeper at one end and through an elongated slot indicated at 11 at the rear end of the plate 4. The slot 11 is disposed longitudinally of the plate 4 and is preferably alined with the channel 7. This construction permits of the pivotal support of the keeper moving longitudinally of the plate toward or away from the adjacent end of the channel 7.

The keeper 5 is of peculiar configuration, and is provided at its free end with a nose portion 12 adapted to engage over the bill 9 of the hook member, and this nose portion constitutes a connecting member for the side plates of the said keeper member. The said side plates are connected adjacent the outer end of the keeper by a stud 13, the said stud being of a diameter substantially equal to the width of the channel 7. This stud is adapted to engage beneath the shoulder 10 on the plate 4, and is spaced from the pivot member 6 a distance such that it will be so positioned when the pivot has been moved to its limit rearwardly of the plate 4. When in this position, the nose 12 will be engaged firmly with the bill 9 of the hook member, and thus the link 8 will be prevented from becoming disengaged from within the channel 7.

The plate 4 is provided with an enlarged portion 14, the latter having a downwardly and forwardly inclined face 15, over which the stud 13 rides. The inclined face 15 of the enlargement 14 extends downwardly and joins the shoulder or overhanging portion 10 by an abrupt wall, and it is obvious from this construction, that the keeper in being moved from open to closed position will be caused to ride forwardly. This forward movement is necessitated by the stud 13 riding downwardly and forwardly upon the inclined surface 15 of the enlarged portion 14, and when the stud passes into the channel 7, the keeper may be moved rearwardly thus causing the pivot 6 to pass to the rear end of slot 11, and the stud 13 to engage beneath the shoulder 10. The reverse of these movements must be carried out in order to open the keeper member. The forward edges of the side members of the keeper 5 are recessed as at 16, the said recessed portions being adapted to aline with the channel 7 when the keeper is closed or in locking position. The metal upon the side members of the keeper directly beneath the recesses 16 is rounded off as at 17. This rounded portion is so arranged as to pass in close proximity to the inner end of link 8, when the keeper member is being moved from open to closed position or vice versa, and it is necessary in so moving the keeper member that the stud 13 be kept in contact with the abrupt wall connecting the inclined face 15 with the overhanging shoulder 10.

In practice, the improved fastener is permanently secured to one end of the tire chain by passing the extremities of the end link thereof around the pivot pin 6, as indicated in Figs. 1 and 3 of the drawings. The chain thus equipped with the fastening member is applied to the wheel, and the free end of the chain is passed beneath the bill 9 of the hook member. The keeper 5 is then swung downwardly, and the engagement of stud 13 with inclined face 15 causes the forward end of the keeper to move forwardly. When the stud 13 has passed beyond the lower end of the inclined surface 15, however, the keeper will drop downwardly, being limited in its downward movement by engagement of the nose 12 with the bill 9. When the stud 13 moves beyond the said inclined surface, the tension created by so stretching the chain will cause the pivot 6 to be moved to the rear end of slot 11, whereupon the stud 13 is drawn beneath the overhanging portion or shoulder 10. The parts remain in this position due to the tension of the chain and danger of the keeper moving to open position is obviated. Should the keeper 5 be forced forwardly of the plate which might be caused by a sudden change in direction of rotation of the wheels, the rounded portions 17 of the keeper will pass beneath the inner end of the link 8, and accidental opening of the keeper in such occurrence will be prevented.

It is obvious from the foregoing that I have provided a fastening member for chain ends which is extremely simple and inexpensive to construct, and yet which may be quickly and easily operated. It is at once apparent that moving the keeper 5 to unlocked position must be accomplished by moving the same forwardly, and at the proper time, swinging the same outwardly upon its pivot 6. By constructing the fastener in such manner that these movements must be performed, it is obvious that accidental unlocking of the fastener will be prohibited.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the appended claims.

Having thus fully described the invention, what I claim as new and desire to secure by Letters Patent, is:—

1. In a chain fastener, a hook member having a longitudinally disposed elongated opening at its rear end alined with the channel portion of said hook member, a keeper pivoted at one end in said opening, the said keeper adapted at its outer end to engage over the end of said hook member, and a chain connected to the pivot of said keeper.

2. In a chain fastener, a hook member having an elongated slot at the rear end thereof alined with the channel of said hook, an inclined face adjacent the rear end of said hook member, a keeper pivoted at one end in said slot and adapted to swing downwardly over said member, a pin carried by said keeper and being adapted to ride on said inclined surface, and a chain connected to the pivot of said keeper.

3. In a chain fastener, a plate having an elongated longitudinally extending channel communicating with one edge of said plate for a portion of its length, a keeper pivoted at one end to said plate and adapted to close over the open portion of said channel, the pivot for said keeper alined with said channel and capable of moving longitudinally of said plate, a stud carried by said keeper and adapted to enter said channel at the open portion thereof, when the keeper is in closed position, a shoulder overhanging said channel at one end and adapted to hold said stud against movement away from said plate, and a chain secured to the pivot of said keeper.

4. In a chain fastener, a plate having a longitudinally disposed channel therein, a hook bill at one end of said channel, an overhanging shoulder at the opposite end of said channel, the said plate having an elongated slot therein alined with said channel, a pivot pin in said slot, a keeper connected at one end to said pin and adapted to close over said bill, a stud on said keeper, an enlarged portion on said plate at one side thereof and having an inclined face adjacent said shoulder, the said stud adapted to ride upon said face, and a chain link connected to said pivot pin.

5. In a chain fastener, a plate having a hook at one end and a slot at the opposite end disposed parallel with the channel portion of said hook, a keeper having a pivot pin at one end arranged in said slot and adapted at its free end to close over said hook, a pin on said keeper so positioned as to enter the said channel portion when the keeper is closed and to engage the rear wall of the said channel when the pivot of said keeper has moved to its limit in one direction, and a chain connected to the pivot of said keeper.

6. In a chain fastener, a plate having a hook at one end, a keeper swingingly mounted on said plate and capable of sliding longitudinally thereon, means for holding said keeper against swinging movement when the latter has moved to closed position and to its limit in one direction, a chain connected to said keeper at its point of connection with said plate, and the said connecting point of the chain, and the locking means being longitudinally alined with the channel portion of said hook when the said keeper is in closed position.

In testimony whereof I affix my signature in presence of two witnesses.

WALTER C. JOHNSON.

Witnesses:
E. J. MOUNTZ,
W. I. KORMAN.